United States Patent [19]

Kuhne et al.

[11] 4,169,091
[45] Sep. 25, 1979

[54] SYMMETRICAL AND ASYMMETRICAL DISAZO COMPOUNDS CONTAINING A BIS-(NITRO-ARYLOXY)ALKANE MIDDLE COMPONENT

[75] Inventors: Rudolf Kühne, Frankfurt am Main; Heinrich Hamal, Liederbach, both of Fed. Rep. of Germany

[73] Assignee: Hoechst Aktiengesellschaft, Frankfurt am Main, Fed. Rep. of Germany

[21] Appl. No.: 862,667

[22] Filed: Dec. 21, 1977

[30] Foreign Application Priority Data

Dec. 23, 1976 [DE] Fed. Rep. of Germany ....... 2658396

[51] Int. Cl.² ..................... C09B 35/22; C09B 35/34; D06P 1/46; D06P 1/52
[52] U.S. Cl. .................................... 260/160; 106/23; 106/288 Q; 106/308 Q; 260/176
[58] Field of Search ................................ 260/160, 176

[56] References Cited

U.S. PATENT DOCUMENTS

| | | | |
|---|---|---|---|
| 3,124,556 | 3/1964 | Jung et al. | 260/160 |
| 3,218,311 | 11/1965 | Forter et al. | 260/161 |
| 3,759,894 | 9/1973 | Angliuer et al. | 260/158 |
| 3,910,875 | 10/1975 | Rieper et al. | 260/161 |
| 3,954,398 | 5/1976 | Ramanathan | 260/160 X |

FOREIGN PATENT DOCUMENTS

| | | | |
|---|---|---|---|
| 47301 | 11/1888 | Fed. Rep. of Germany | 260/176 |
| 2434432 | 2/1975 | Fed. Rep. of Germany | 260/154 |
| 1438900 | 6/1976 | United Kingdom | 260/154 |

Primary Examiner—Floyd D. Higel
Attorney, Agent, or Firm—Curtis, Morris & Safford

[57] ABSTRACT

Symmetrical and asymmetrical disazo compounds of the formula

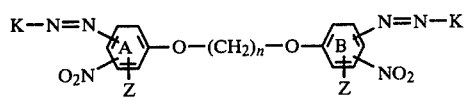

wherein
K is the radical of an enolized or enolizable coupling component,
Z is hydrogen, halogen, lower alkyl, lower alkoxy or nitro and
n is 1 to 10 and wherein an asymmetry can be caused by a different position of the substituents on the benzene rings A and B and/or by different substituents Z and/or different coupling component radicals K, and mixtures of such compounds are colorants, especially pigments, of a high tinctorial strength and purity of shade, good rheological properties in lacquers and printing inks, high luster of colorations, good fastness to light, solvents, alkali, acids and migration, combined with a good covering power. Especially the combination of good covering power and high tinctorial strength is advantageous for lacquers and printing inks.

13 Claims, No Drawings

SYMMETRICAL AND ASYMMETRICAL DISAZO COMPOUNDS CONTAINING A BIS-(NITRO-ARYLOXY)ALKANE MIDDLE COMPONENT

The present invention relates to valuable symmetric and asymmetric disazo compounds, and their mixtures, processes for their manufacture and their use as colorants.

It has been found that valuable new symmetric and asymmetric disazo compounds of the general formula 1

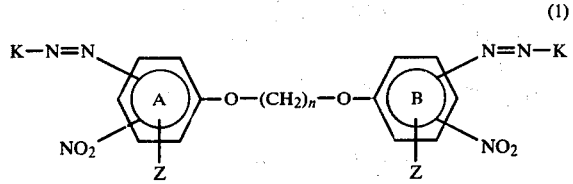
(1)

or their mixtures are obtained when 1 mole of a symmetric or asymmetric diamine or of a mixture of symmetric and/or asymmetric diamines of the general formula 2

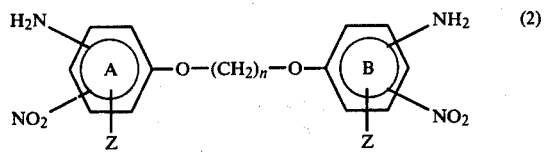
(2)

is bis-diazotized and the resulting bis-diazonium salt or the mixtures of the resulting bis-diazonium salts are allowed to act on 2 moles of one or more enolized ketomethylene compounds in an aqueous or organic medium.

In the general formulae 1 and 2, K denotes the radical of an enolized or enolizable ketomethylene compound, Z denotes a hydrogen or halogen atom, a lower alkyl or alkoxy group with up to 4 C atoms in each case or a nitro group and n denotes an integer from 1 to 10, preferably from 1 to 4. The asymmetry can be caused here by the different position of the substituents in the rings A and B or/and different substituents Z.

Disazo compounds of the formula 1, and their mixtures, in which K corresponds to the formula 3

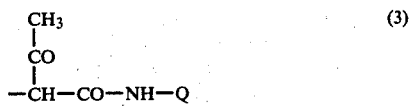
(3)

where Q denotes a carbocyclic or heterocyclic aromatic radical, are of particular interest.

Disazo compounds, and their mixtures, of the general formula 1 in which K corresponds to the formula 4

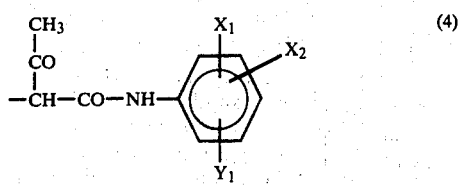
(4)

where $x_1$ and $x_2$ denote hydrogen, fluorine, chlorine or bromine atoms or alkyl or alkoxy groups with 1 to 6 carbon atoms in each case and $y_1$ denotes a hydrogen, fluorine, chlorine or bromine atom, an alkyl, alkoxy or carbalkoxy group with 1 to 6 carbon atoms in the alkyl radical in each case, a cyano group, a trifluoromethyl group, an alkanoylamino group with up to 5 C atoms, a benzoylamino group which is optionally substituted by chlorine atoms or alkyl or alkoxy groups with up to 4 C atoms in each case, or a group of the formula —X—NR'R", in which X denotes CO or SO$_2$, R' denotes hydrogen or an alkyl group with 1 to 4 C atoms and R" denotes hydrogen, an alkyl group with 1 to 4 C atoms or a phenyl group, it being possible, furthermore, for the radicals $x_1$ and $x_2$ to denote a fused benzene, imidazolone or oxazolone ring, are preferred.

In further preferred disazo compounds of the formula 1, and their mixtures, K represents a group of the formula 5

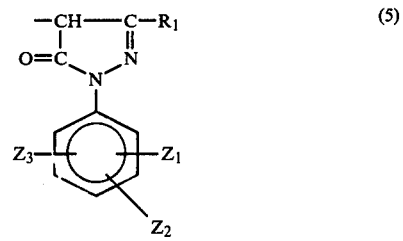
(5)

where $R_1$ is an alkyl group with 1–6 carbon atoms, a carboxy group or a carbalkoxy group with 1–6 carbon atoms in the alkyl radical, $z_1$ and $z_2$ denote hydrogen, fluorine, chlorine or bromine atoms or alkyl or alkoxy groups with 1 to 6 carbon atoms in each case and $z_3$ denotes a hydrogen, fluorine, chlorine or bromine atom, an alkyl or alkoxy group with 1 to 6 carbon atoms in each case or a group of the formula —X—NR'R", in which X denotes CO or SO$_2$, R' denotes hydrogen or an alkyl group with 1 to 4 C atoms and R" denotes hydrogen, an alkyl group with 1 to 4 C atoms or a phenyl group, it being possible, furthermore, for the radicals $z_1$ and $z_2$ to denote a fused benzene ring.

The symmetric diamines which are suitable as diazo components can be manufactured, for example, by reacting the corresponding nitroaminophenols, appropriately with a protected amino group, with dihalogenoalkanes. Suitable mixtures of symmetric and asymmetric diamines are obtained when 2 moles of a mixture of two or more, optionally isomeric nitroaminophenols, appropriately with a protected amino group, are subjected to a condensation reaction with 1 mole of a diahalogenoalkane.

Asymmetric diamines suitable as diazo components can be obtained, for example, when 1 mole of a nitroacetaminophenol is first subjected to a condensation reaction with at least 1 mole of a dihalogenoalkane, under mild reaction conditions, to give a ω-halogenoalkoxy-nitroacetanilide, and this is subjected to a condensation reaction with a second mole of another, optionally isomeric, nitro-acetaminophenol, under more severe reaction conditions, to give a diphenoxy compound and the acetyl groups are split off by saponification.

Examples which may be mentioned of symmetric diamines, containing nitro groups, from the bis-(phenoxy)-alkane series which are suitable for the manufacture of the disazo compounds according to the invention are: bis-(5-nitro-2-amino-phenoxy)-methane, 1,2-bis-(5-nitro-2-amino-phenoxy)-ethane, 1,3-bis-(5-nitro-2-amino-phenoxy)-propane, 1,4-bis-(5-nitro-2-amino-phenoxy)-butane, bis-(3-nitro-4-amino-phenoxy)-methane, 1,2-bis-(3-nitro-4-amino-phenoxy)-ethane, 1,3-bis-(3-nitro-4-amino-phenoxy)-propane, 1,4-bis-(3-nitro-4-amino-phenoxy)-butane, 1,5-bis-(3-nitro-4-amino-phenoxy)-pentane, 1,6-bis-(3-nitro-4-amino-phenoxy)-hexane, 1,10-bis-(3-nitro-4-amino-phenoxy)-decane, bis-(4-nitro-2-amino-phenoxy)-methane, 1,2-bis-(4-nitro-2-amino-phenoxy)-ethane, 1,3-bis-(4-nitro-2-amino-phenoxy)-propane, 1,4-bis-(4-nitro-2-amino-phenoxy)-butane, bis-(2-nitro-4-amino-phenoxy)-methane, 1,2-bis-(2-nitro-4-amino-phenoxy)-ethane, 1,3-bis-(2-nitro-4-amino-phenoxy)-propane, 1,4-bis-(2-nitro-4-amino-phenoxy)-butane, bis-(4-chloro-5-nitro-2-amino-phenoxy)-methane, 1,2-bis-(4-chloro-5-nitro-2-amino-phenoxy)-ethane, 1,3-bis-(4-chloro-5-nitro-2-amino-phenoxy)-propane, 1,4-bis-(4-chloro-5-nitro-2-amino-phenoxy)-butane, 1,2-bis-(4-chloro-6-nitro-2-amino-phenoxy)-ethane, 1,2-bis-(6-chloro-4-nitro-2-amino-phenoxy)-ethane, 1,2-bis-(4-nitro-6-methyl-2-amino-phenoxy)-ethane, 1,2-bis-(4,6-dinitro-2-amino-phenoxy)-ethane and 1,4-bis-(4,6-dinitro-2-amino-phenoxy)-butane.

Asymmetric diamines of the diphenoxy-alkane series which may be mentioned which contain nitro groups and are suitable for the manufacture of the disazo compounds according to the invention are: (4',5''-dinitro-2',2''-diamino)-diphenoxy-methane, (4',5''-dinitro-2',2''-diamino)-1,2-diphenoxy-ethane, (4',5''-dinitro-2',2''-diamino)-1,3-diphenoxy-propane, (4',5''-dinitro-2',2''-diamino)-1,4-diphenoxy-butane, (3',5''-dinitro-4',2''-diamino)-1,2-diphenoxy-ethane, (2',5''-dinitro-4',2''-diamino)-1,2-diphenoxy-ethane, (3',4''-dinitro-4',2''-diamino)-1,2-diphenoxy-ethane, (2',4''-dinitro-4',2''-diamino)-1,2-diphenoxy-ethane, (2',3''-dinitro-4',4''-diamino)-1,2-diphenoxy-ethane, (4'-chloro-5',5''-dinitro-2',2''-diamino)-1,2-diphenoxy-ethane, (4'-chloro-5',3''-dinitro-2',4''-diamino)-1,2-diphenoxy-ethane, (4'-chloro-5',2''-dinitro-2',4''-diamino)-1,2-diphenoxy-ethane, (4',6''-dichloro-5',4''-dinitro-2',2''-diamino)-1,2-diphenoxy-ethane and (4'-chloro-5',6''-dinitro-4''-methyl-2',2''-diamino-diphenoxy)-ethane.

Further diamines which may be mentioned which are also suitable for the manufacture of the disazo compounds according to the invention are: bis-(3-nitro-2-amino-phenoxy)-methane, 1,2-bis-(3-nitro-2-amino-phenoxy)-ethane, 1,3-bis-(3-nitro-2-amino-phenoxy)-propane, 1,4-bis-(3-nitro-2-amino-phenoxy)-butane, bis-(6-nitro-2-amino-phenoxy)-methane, 1,2-bis-(6-nitro-2-amino-phenoxy)-ethane, 1,3-bis-(6-nitro-2-amino-phenoxy)-propane, 1,4-bis-(6-nitro-2-amino-phenoxy)-butane, bis-(2-nitro-3-amino-phenoxy)-methane, 1,2-bis-(2-nitro-3-amino-phenoxy)-ethane, 1,3-bis-(2-nitro-3-amino-phenoxy)-propane, 1,4-bis-(2-nitro-3-amino-phenoxy)-butane, bis-(4-nitro-3-amino-phenoxy)-methane, 1,2-bis-(4-nitro-3-amino-phenoxy)-ethane, 1,3-bis-(4-nitro-3-amino-phenoxy)-propane, 1,4-bis-(4-nitro-3-amino-phenoxy)-butane, bis-(5-nitro-3-amino-phenoxy)-methane, 1,2-bis-(5-nitro-3-amino-phenoxy)-ethane, 1,3-bis-(5-nitro-3-amino-phenoxy)-propane, 1,4-bis-(5-nitro-3-amino-phenoxy)-butane, bis-(6-nitro-3-amino-phenoxy)-methane, 1,2-bis-(6-nitro-3-amino-phenoxy)-ethane, 1,3-bis-(6-nitro-3-amino-phenoxy)-propane, 1,4-bis-(6-nitro-3-amino-phenoxy)-butane, bis-(5-nitro-4-methoxy-2-amino-phenoxy)-methane, 1,2-bis-(5-nitro-4-methoxy-2-amino-phenoxy)-ethane, 1,4-bis-(5-nitro-4-methoxy-2-amino-phenoxy)-butane, 1,2-bis-(6-nitro-4-methyl-2-amino-phenoxy)-ethane and 1,4-bis-(6-nitro-4-methyl-2-amino-phenoxy)-butane.

Suitable mixtures of diamines which are easily accessible industrially and which may be used are preferably those which are formed in the reaction of 2 moles of a mixture of two different, optionally isomeric nitro-acetaminophenols with about 1 mole of a dihalogenoalkane and subsequent splitting off of the acetyl groups. These mixtures consist of two symmetric diamines and one asymmetric diamine.

By using diamine mixtures of this type, the composition of which can be varied as desired, it is possible, in particular, to influence the color shade in the desired direction.

Suitable coupling components are those of the general formula 6

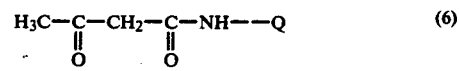

wherein Q denotes a carbocyclic or heterocyclic aromatic radical, and in particular acetoacetic acid arylamides of the general formula 7

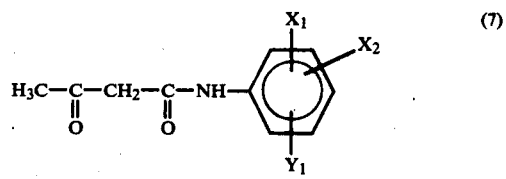

wherein the radicals $x_1$, $x_2$ and $y_1$ have the abovementioned meaning. Examples which may be mentioned of coupling components of the acetoacetic acid arylamide series are: acetoacetanilide, acetoacetyl-2-chloroanilide, acetoacetyl-3-chloroanilide, acetoacetyl-4-chloroanilide, acetoacetyl-2,4-dichloroanilide, acetoacetyl-2,5-dichloroanilide, acetoacetyl-2,3,4-trichloroanilide, acetoacetyl-2,4,5-trichloroanilide, acetoacetyl-2,4,6-trichloroanilide, acetoacetyl-4-bromoanilide, acetoacetyl-4-fluoroanilide, acetoacetyl-4-cyanoanilide, acetoacetyl-2-toluidide, acetoacetyl-3-toluidide, acetoacetyl-4-toluidide, acetoacetyl-2,4-xylidide, acetoacetyl-2,5-xylidide, acetoacetyl-2,4,5-trimethylanilide, acetoacetyl-2,4,6-trimethylanilide, acetoacetyl-2-methyl-3-chloroanilide, acetoacetyl-2-methyl-4-chloroanilide, acetoacetyl-2-methyl-5-chloroanilide, acetoacetyl-2-methyl-4,5-dichloroanilide, acetoacetyl-2-anisidide, acetoacetyl-3-anisidide, acetoacetyl-4-anisidide, acetoacetyl-2-phenetidide, acetoacetyl-3-phenetidide, acetoacetyl-4-phenetidide, acetoacetyl-2,4-dimethoxyanilide, acetoacetyl-2,5-dimethoxyanilide, acetoacetyl-2-methoxy-4-chloroanilide, acetoacetyl-2-methoxy-5-chloroanilide, acetoacetyl-2-methoxy-4,5-dichloroanilide, acetoacetyl-2,4-dimethoxy-5-chloroanilide, acetoacetyl-2,5-dimethoxy-4-chloroanilide, acetoacetyl-2-methoxy-4-chloro-5-methylanilide, acetoacetyl-2-trifluoromethylanilide, acetoacetyl-4-acetylamino-anilide, acetoacetyl-4-benzoylamino-anilide, acetoacetyl-2-methoxy-4-acetylamino-5-chloroanilide, 1-acetoacetylamino-naphthalene, 2-acetoacetylamino-naphthalene, 3-acetoacetylamino-benzamide, 4-acetoacetylamino-benzamide, 3-acetoacetylaminobenzoic acid N-methylamide, 3-acetoacetylaminobenzoic acid N-ethylamide, 3-acetoacetylamino-benzanilide, 4-acetoacetylamino-benzanilide, 3-acetoacetylaminobenzoic acid N-methylanilide, 3-acetoacetylaminobenzoic acid N-ethylanilide, 4-acetoacetylaminobenzoic acid N-methylanilide, 4-acetoacetylaminobenzoic acid N-ethylanilide, 3-acetoacetylamino-4-methylbenzamide, 3-acetoacetylamino-4-methoxybenzamide, 3-acetoacetylamino-4-chlorobenzamide, 3-acetoacetylamino-4-methylbenzanilide, 3-acetoacetylamino-4-methoxybenzanilide, 3-acetoacetylamino-4-chlorobenzanilide, 4-acetoacetylamino-benzenesulfonamide, 4-acetoacetylamino-benzenesulfonic acid anilide, 4-acetoacetylamino-benzenesulfonic acid N-methylanilide, acetoacetyl-4-carbethoxy-anilide, acetoacetyl-2-carbethoxy-anilide, 2-acetoacetylamino-6-methoxy-benzthiazole, 2-acetoacetylamino-6-ethoxy-benzthiazole, 5-acetoacetylamino-benzoxazolone, 5-acetoacetylamino-benzimidazolone, 5-acetoacetylamino-6-chlorobenzimidazolone, 5-acetoacetylamino-6-bromobenzimidazolone, 5-acetoacetylamino-7-chlorobenzimidazolone, 5-acetoacetylamino-7-bromobenzimidazolone, 5-acetoacetylamino-6-methylbenzimidazolone, 5-acetoacetylamino-7-methylbenzimidazolone, 5-acetoacetylamino-6-methoxybenzimidazolone, 5-acetoacetylamino-7-methoxybenzimidazolone, 5-acetoacetylamino-N-methylbenzimidazolone, 5-acetoacetylamino-N-ethylbenzimidazolone, 5-acetoacetylamino-N,N'-dimethylbenzimidazolone, 5-acetoacetylamino-N,N'-diethylbenzimidazolone, 1-acetoacetylamino-anthraquinone and 2-acetoacetylamino-anthraquinone.

Further preferred coupling components are 1-aryl-pyrazol-5-ones of the general formula 8

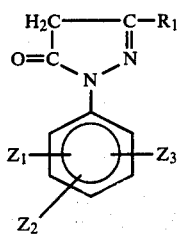

(8)

wherein $z_1$, $z_2$, $z_3$ and $R_1$ have the meaning indicated.

Examples which may be mentioned of coupling components of the 1-aryl-pyrazol-5-one series are: 1-phenyl-3-methyl-pyrazol-5-one, 1-(2'-tolyl)-3-methyl-pyrazol-5-one, 1-(3'-tolyl)-3-methyl-pyrazol-5-one, 1-(4'-tolyl)-3-methyl-pyrazol-5-one, 1-(2'-chlorophenyl)-3-methyl-pyrazol-5-one, 1-(3'-chlorophenyl)-3-methyl-pyrazol-5-one, 1-(4'-chlorophenyl)-3-methyl-pyrazol-5-one, 1-(2',5'-dichlorophenyl)-3-methyl-pyrazol-5-one, 1-(4-bromo-phenyl)-3-methyl-pyrazol-5-one, 1-(4-fluoro-phenyl)-3-methyl-pyrazol-5-one, 1-(2',4',6'-trichloro-phenyl)-3-methyl-pyrazol-5-one, 1-(6'-chloro-2'-methyl-phenyl)-3-methyl-pyrazol-5-one, 1-(4'-methoxy-phenyl)-3-methyl-pyrazol-5-one, 1-(1'-naphthyl)-3-methyl-pyrazol-5-one, 1-(2'-naphthyl)-3-methyl-pyrazol-5-one, 1-(phenyl-3'-carboxamide)-3-methyl-pyrazol-5-one, 1-(phenyl-4'-carboxamide)-3-methyl-pyrazol-5-one, 1-(phenyl-4'-sulfonamide)-3-methyl-pyrazol-5-one, 1-(phenyl-3'-carboxylic acid methylamide)-3-methyl-pyrazol-5-one, 1-(phenyl-4'-sulfonic acid methylamide)-3-methyl-pyrazol-5-one, 1-(phenyl-3'-carboxylic acid anilide)-3-methyl-pyrazol-5-one, 1-(phenyl-4'-sulfonic acid anilide)-3-methyl-pyrazol-5-one, 1-phenyl-3-carboxy-pyrazol-5-one, 1-phenyl-3-carbethoxy-pyrazol-5-one and 1-phenyl-3-carbo-n-butoxy-pyrazol-5-one.

The diamines of the formula 2 are preferable bis-diazotized using alkali metal nitrites and a mineral acid in water, and it can be appropriate to add surface-active substances, in the sense of non-ionic, cationic or anionic wetting agents, dispersing agents and emulsifying agents, and/or weak to moderately strong organic or inorganic acids, such as, for example, formic acid, acetic acid, propionic acid or phosphoric acid. Moreover, it is also possible to carry out the bis-diazotization using nitrosylsulfuric acid or in an organic medium using an alkyl nitrite, for example using n-butyl nitrite, advantageously at −20° to +40° C., in particular at 0° to 20° C.

The disazo compounds according to the invention, and their mixtures, are manufactured by a coupling reaction in accordance with processes which are in themselves known, preferably by combining the bis-diazonium compounds with the coupling components in an aqueous medium, in which procedure it can be appropriate to add the surface-active substances mentioned. It can likewise be favorable in some cases to carry out the coupling in the presence of suitable organic solvents, for example with the addition of alcohols, such as lower alkanols, dioxane, tetrahydrofuran, formamide, dimethylformamide, dimethylsulfoxide, N-methylpyrrolidone or pyridine bases. Furthermore, it is possible to carry out the coupling exclusively in organic solvents or solvent mixtures, especially if the diazotization has been carried out with an alkyl nitrite or with nitrosylsulfuric acid in an organic solvent; in this case it can then be appropriate to add suitable organic bases, for example pyridine bases, or alkylamines or proton acceptors. In general, the coupling is carried out at 0° to 40° C., advantageously at 0° to 20° C.

In many cases it is also advantageous, with respect to the nature of the particles and the crystal structure of the resulting disazo compounds, to subject the resulting coupling suspension to an after-treatment with heat after the coupling, for example to heat it to a higher temperature for some time, to boil it or to keep it under pressure at temperatures above the boiling point under normal pressure. In this procedure, the effect of the after-treatment with heat can be further increased in many cases by adding suitable organic solvents, such as, for example, alcohols, such as lower alkanols, glacial acetic acid, nitrobenzene, halogenobenzenes, halogenonaphthalenes, phthalic acid monoesters and diesters, pyridine bases, quinoline bases, dimethylformamide, dimethylsulfoxide or N-methylpyrrolidone, and/or the addition of surface-active substances. The after-treatment is advantageously carried out at 40° to 200° C., preferably at 80° to 180° C., in particular at 100° to 150° C.

Furthermore, the disazo compounds according to the invention, and their mixtures, can be extended in the coupling suspension or in the press cake by customary processes, for example with metal salts of higher fatty acids, with metal resinates or with the free saturated or unsaturated fatty acids themselves, and likewise with free resin acids, such as are obtained in the acid precipitation of alkali metal resinates, or with fatty amines and/or their salts. In addition, it is also possible to incorporate mineral oils, silicone oils, fatty oils, fats and resins, in bulk or in the emulsified form, and to incorporate synthetic resin dispersions and dispersions of other high-molecular solids. The disazo compounds according to the invention, and their mixtures, can furthermore be manufactured in the presence of a carrier, for example barite.

Particularly pure pigments of high tinctorial strength with valuable technological properties are obtained in many cases if, after being separated off from the coupling suspension in the form of the moist press cake or as a dry powder, the disazo compounds according to the invention, and their mixtures, are subjected to an after-treatment with heat with organic or aqueous-organic solvents or solvent mixtures, optionally with the addition of suitable surface-active substances, for example with alcohols, in particular lower alkanols, glacial acetic acid, pyridine bases, quinoline bases, N-methylpyrrolidone, formamide, dimethylformamide, dimethylsulfoxide, nitrobenzene, halogenobenzenes and halogenonaphthalenes. Furthermore, it is possible to influence the nature of the particles of the resulting pigments by dry or moist grinding, optionally with the addition of suitable grinding auxiliaries or extenders.

The disazo compounds according to the invention, and their mixtures, are valuable yellow to orange-colored colorants of high tinctorial strength, high purity of color and good fastness properties. They are outstandingly suitable for pigmenting high-molecular organic material, for dyeing or printing plastics, natural and synthetic resins, rubber, paper, viscose, cellulose, cellulose esters, cellulose ethers, polyvinyl chloride, polyamides, polyolefins, polyurethanes, polyacrylonitrile or polyglycol terephthalates, and for the manufacture of printing inks, gloss paints and emulsion paints and for pigmenting printing pastes for graphic and textile printing, as well as for printing metal surfaces.

In the examples which follow, unless otherwise indicated, the percentage data relate to the weight.

EXAMPLE 1

32.0 g of bis-(5-nitro-2-amino-phenoxy)-methane are stirred with 200 ml of 5 N hydrochloric acid at room temperature for several hours. 200 g of ice are added to the resulting crystal sludge, which consists of the hydrochloride of the base, and diazotization is carried out in the customary manner by adding 41 ml of 5 N sodium nitrite solution dropwise. After clarifying the resulting bis-diazonium salt solution with kieselguhr, excess nitrite is destroyed, shortly before the coupling, by adding amidosulfonic acid.

37.2 g of acetoacetanilide are stirred with 500 ml of water and dissolved by adding 120 ml of 2 N sodium hydroxide solution. After adding 20 ml of an aqueous solution of 1.0 g of an oxyethylation product of 1 mole of stearyl alcohol and 20 moles of ethylene oxide, the volume of the mixture is adjusted to 1,000 ml and the temperature is adjusted to 20° C. The coupling component is precipitated in the finely divided form by adding 120 ml of 2 N acetic acid dropwise, whilst stirring rapidly. 200 ml of 4 N sodium acetate solution are then added and the pH value is adjusted to 5.5 by adding a small amount of acetic acid.

The coupling with the bis-diazonium salt solution described above is effected in the course of 1 hour at a temperature of 20° C., the diazonium salt solution running in beneath the surface of the intensively stirred coupling suspension, and in particular in such a way that it is never possible to detect an excess of diazonium salt in the coupling mixture. After the coupling, the mixture is stirred for a further 30 minutes at 20° C. and then filtered and the residue on the filter is washed with water until salt-free.

The resulting moist press cake is stirred with a mixture consisting of equal parts by volume of methanol and water to give a homogeneous suspension and the suspension is heated to the boil and kept at the boiling point for 30 minutes. After cooling to room temperature, the solid is filtered off and washed with the mixture described. Drying is carried out in a vacuum drying cabinet at about 70° C.

After grinding, a greenish-tinged yellow pigment powder is obtained which corresponds to the following formula

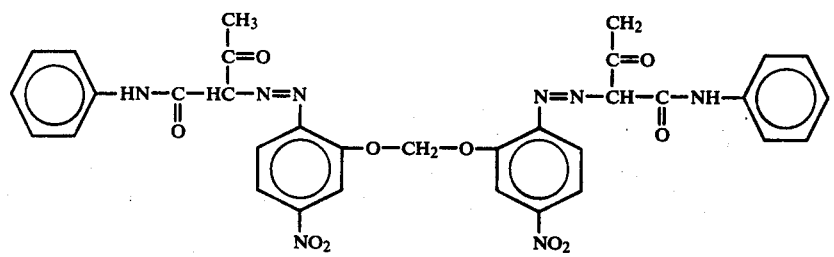

EXAMPLE 2

The procedure is as described in Example 1, but with the alteration that 40.2 g of acetoacetyl-o-toluidide are used as the coupling component. After drying and grinding, a greenish-tinged yellow pigment powder is obtained. 15 parts of the pigment are incorporated, in 4 passes on a triple roll mill, into 85 parts of a commercially available letterpress printing varnish which has the following composition:
40% of phenolic resin, modified with colophonium,
20% of linseed oil for varnishes and
40% of mineral oil of boiling range 280°–310° C.

Prints with an ink coating of 1 g/m² are produced on white art paper with the resulting yellow letterpress printing ink, which has good rheological properties and can be easily printed, using a proof printing apparatus. Very deep, greenish-tinged yellow prints of high purity of color, good surface gloss and good fastness to light are obtained. They exhibit a very good resistance towards spirit, lacquer solvent (consisting of 50% of ethyl acetate, 40% of toluene and 10% of n-butanol), alkalis and acids and so sign of bleeding in the presence of a soap gel and in the presence of butter.

Similarly good results are obtained in special gravure printing. 18 g of pigment, 24 g of ethyl acetate and 198 g of special gravure printing varnish are dispersed in a ball mill, which is charged with ceramic beads of 2 mm diameter as grinding bodies, for 20 minutes. The special gravure printing varnish has the following composition:
15% of nitrocellulose,
15% of maleate resin,
10% of dibutyl phthalate,
12% of ethyl acetate,
8% of ethylglycol and
40% of ethyl alcohol.

Prints are produced on aluminum foil and on black and white ground paper with the resulting special gravure printing ink, which exhibits good rheological properties and can be easily printed, using a proof printing block of 10, 20 and 40 μm depth of etching and with the aid of a proof printing apparatus. Greenish-tinged yellow prints of high tinctorial strenth, good surface gloss, high purity of color and good fastness to light and solvents are obtained. The prints on the black ground and on aluminium foil show good hiding power, which, in combination with good depth of color, is very desirable in the printing of packaging material.

EXAMPLE 3

The procedure is as described in Example 1, but with the alteration that 32.0 g of bis-(3-nitro-4-amino-phenoxy)-methane are used as the diazo component and 43.1 g of acetoacetyl-2,4-xylidide are used as the coupling component. After grinding, a reddish-tinged yellow pigment powder is obtained which corresponds to the following formula

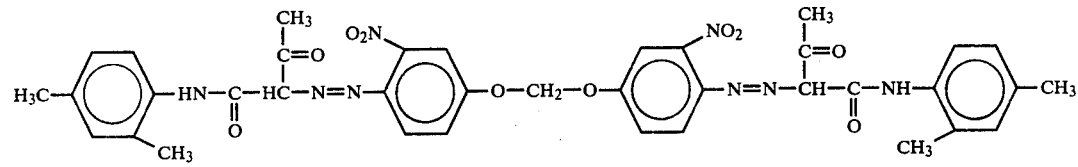

A letterpress printing ink is prepared with the resulting pigment, as described in Example 2, and this is printed, with an ink coating of 1 g/m², on to white art paper, the ink exhibiting good rheological properties and good ease of printing. Reddish-tinged yellow prints of high tinctorial strength are obtained which exhibit good surface gloss and good fastness to light and are resistant towards spirit, lacquer solvents, alkalis and acids.

If 0.1% of the same pigment are incorporated, together with 0.5% of titanium dioxide, into plasticized PVC on a roll mill in the customary manner and sheets are produced from this composition in the customary manner, reddish-tinged yellow shades of high tinctorial strength and good fastness to light and migration are obtained.

EXAMPLE 4

33.4 g of 1,2-bis-(5-nitro-2-amino-phenoxy)-ethane are dissolved in 150 ml of sulfuric acid (50% strength) at about 60° C. and this solution is added dropwise into a mixture of 800 g of ice and 41 ml of 5 N sodium nitrite solution in the course of 30 minutes, during which the temperature may not exceed +3° C. The mixture is subsequently stirred for 30 minutes with a slight excess of nitrite and is clarified with kieselguhr and the excess of nitrite is destroyed, immediately before the coupling, by adding a small amount of amidosulfonic acid. Coupling with a fine-particled suspension, manufactured according to Example 1, of 37.2 g of acetoacetanilide is effected at 20° C. in the course of 1 hour, the pH value being kept between 5.0 and 5.5 by periodically adding 5 N sodium hydroxide solution dropwise. The after-treatment and working up are carried out as described in Example 1. A greenish-tinged yellow pigment powder is obtained which has similar properties to the pigments manufactured according to Example 1 and Example 2.

EXAMPLE 5

49.0 g of 5-acetoacetylamino-benzimidazolone are dissolved in 500 ml of dimethylformamide, 500 ml of 4 N sodium acetate solution and 1 g of the oxyethylate described in Example 1 are added and the mixture is coupled with a bis-diazonium salt solution, prepared from 33.4 g of 1,2-bis-(2-nitro-4-amino-phenoxy)-ethane analogously to Example 1, at 15°–20° C. in the course of 1 hour. After adding 750 ml of water, the mixture is heated to 85°–90° C., stirred at this temperature for 1 hour, cooled to about 60° C. and filtered and the residue is washed with water. The press cake, which is moist from the filtration, is stirred with glacial acetic acid to give a suspension and the suspension is heated to the boil and kept at the boiling point for 2 hours, about one-tenth of the amount of solvent being first distilled off in order to remove adhering water. In the course of the after-treatment, an amount of glacial acetic acid is added at a time such that a suspension which is easily stirrable is always present. The suspension is cooled to about 50° C., three times the volume of methanol is added and the solid is filtered off, washed first with methanol and then with water and dried in vacuo at about 70° C. After grinding, a deep yellow pigment powder is obtained which has excellent resistance towards solvents and leads to yellow shades of high tinctorial strength, which are fast to migration and have good fastness to light, in plasticized PVC.

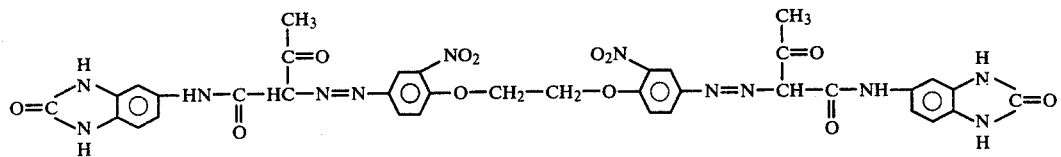

EXAMPLE 6

36.6 g of 1-phenyl-3-methyl-pyrazol-5-one are dissolved in 110 ml of 2 N sodium hydroxide solution and the solution is diluted with 1,250 ml of water, in which 1 g of the oxyethylate mentioned in Example 1 is dissolved. After adding 136 g of crystalline sodium acetate, coupling is carried out with a bis-diazonium salt solution, prepared according to Example 3, at a temperature of +5° to +8° C. in the course of 30 minutes, it being ensured that the bis-diazonium salt solution runs in beneath the surface of the intensively stirred coupling solution and that it is never possible to detect an excess of diazonium salt in the coupling mixture. After the coupling, the mixture is stirred for a further 30 minutes at +5° to +10° C., and thereafter for a further 1 hour at room temperature, is then filtered and the residue is washed with a large amount of water. Drying is carried out in a vacuum drying cabinet at about 70° C. After grinding, an orange-colored pigment powder of the following formula is obtained.

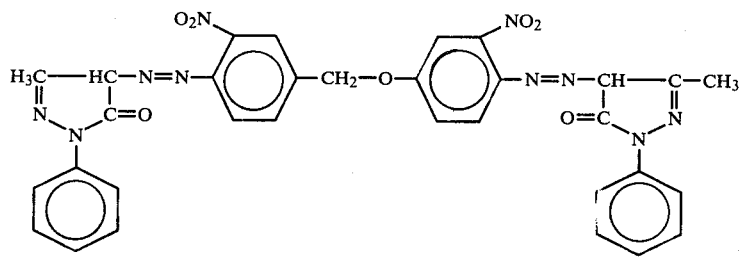

EXAMPLE 7

A mixture of 22.4 g of bis-(3-nitro-4-amino-phenoxy)-methane and 9.6 g of bis-(2-nitro-4-amino-phenoxy)-methane is bis-diazotized analogously to Example 1 and coupled with 43.5 g of acetoacetyl-2-anisidide analogously to Example 1. The resulting coupling suspension is heated to 80° C. by passing in steam and is kept at this temperature for 30 minutes. Thereafter, it is cooled to 60° C. and the solid is filtered off, washed with water and dried in a vacuum drying cabinet at about 80° C. After grinding, a yellow pigment powder is obtained which, after incorporation into a letterpress printing lacquer, leads to a letterpress printing ink which can be easily printed and which gives deep prints of a neutral yellow color shade and high tinctorial strength on white art paper.

The pigment consists of two symmetric disazo compounds; it contains 70 mole % of the pigment A and 30 mole % of pigment B.
A = 1 mole of bis-(3-nitro-4-amino-phenoxy)-methane coupled with 2 moles of acetoacetyl-2-anisidide.
B = 1 mole of bis-(2-nitro-4-amino-phenoxy)-methane coupled with 2 moles of acetoacetyl-2-anisidide.

EXAMPLE 8

A mixture of 16.0 g of bis-(5-nitro-2-amino-phenoxy)-methane and 17.4 g of 1,3-bis-(5-nitro-2-amino-phenoxy)-propane is bis-diazotized according to Example 1 and coupled with 37.2 g of acetoacetanilide. Coupling, after-treatment and working up are carried out as indicated in Example 1. A greenish-yellow pigment powder is obtained which, after incorporation into a gravure printing ink and printing on to white paper, leads to greenish-tinged yellow prints of a very pure shade and high tinctorial strength. The pigment consists of 50 mole % each of two symmetric disazo compounds A and B.
A = 1 mole of bis-(5-nitro-2-amino-phenoxy)-methane coupled to 2 moles of acetoacetanilide.
B = 1 mole of 1,3-bis-(5-nitro-2-amino-phenoxy)-propane coupled to 2 moles of acetoacetanilide.

EXAMPLE 9

A mixture of 29.0 g of 1,4-bis-(5-nitro-2-amino-phenoxy)-butane and 6.4 g of bis-(3-nitro-4-amino-phenoxy)-methane is bisdiazotized analogously to Example 1 and coupled with 43.1 g of acetoacetyl-2,4-xylidide. Coupling, after-treatment and working up are carried out as indicated in Example 1. A reddish yellow pigment powder is obtained. A letterpress printing ink prepared with the resulting pigment gives deep reddish-tinged yellow prints on white art paper. The pigment powder consists of two symmetric disazo compounds, namely of 80 mole % of pigment A and 20 mole % of pigment B.
A = 1 mole of 1,4-bis-(5-nitro-2-amino-phenoxy)-butane coupled with 2 moles of acetoacetyl-2,4-xylidide.
B = 1 mole of bis-(3-nitro-4-amino-phenoxy)-methane coupled with 2 moles of acetoacetyl-2,4-xylidide.

EXAMPLE 10

196 g of 5-nitro-2-acetaminophenol and 196 g of 3-nitro-4-acetaminophenol are stirred in 1,500 ml of ethanol and, after adding 207 g of 1,2-dibromoethane and a solution of 101 g of potassium hydroxide and 1 g of potassium iodide in 120 ml of water, the mixture is heated uniformly, rising to 110° C., in a stirred autoclave in the course of 6 hours and is kept at this temperature for 10 hours. After cooling, the mixture is filtered and the residue is washed first with ethanol and then with water. It is extracted by stirring twice with 2% strength sodium hydroxide solution, the mixture is filtered and the residue is washed until neutral and dried in vacuo at about 70° C. The resulting reaction product is a mixture of 1,2-bis-(5-nitro-2-acetamino-phenoxy)-ethane, 1,2-bis-(3-nitro-4-acetamino-phenoxy)-ethane and (3′,5″-dinitro-4′,2″-diacetamino)-1,2-diphenoxy-ethane. In order to split off the acetyl groups, 50 g of the resulting mixture are introduced into 1,000 ml of sulfuric acid (60% strength) having a temperature of 115°–120° C., whilst stirring, and the mixture is stirred at this temperature for 20 minutes. After cooling to about 50° C. the resulting solution is poured on to 10 liters of water, the diamines being liberated by hydrolysis of the sulfates. The mixture is stirred for a further 2 hours and filtered and the residue is washed with water until neutral and dried in vacuo at about 70° C. An orange-colored powder is obtained which consists of about 25 mole % of 1,2-bis-(5-nitro-2-amino-phenoxy)-ethane, 25 mole % of 1,2-bis-(3-nitro-4-amino-phenoxy)-ethane and 50 mol % of (3′,5″-dinitro-4′,2″-diamino)-1,2-diphenoxy-ethane.

33.4 g of the resulting diamine mixture are dissolved in 150 ml of sulfuric acid (50% strength) at about 60° C. and the solution is added dropwise into a mixture of 800 g of ice and 41 ml of 5 N sodium nitrite solution in the course of 30 minutes, whilst stirring, during which the temperature may not exceed +3° C. The mixture is then stirred for a further 30 minutes, during which a slight excess of nitrite should be present, and is clarified with kieselguhr and the excess of nitrite is removed, immediately before the coupling, with a little amidosulfonic acid. The coupling with a fine-particled suspension, prepared according to Example 1, of acetoacetanilide is effected in the course of 1 hour at 20° C., the pH value being maintained at 5.0–5.5 by adding a 5 N sodium hydroxide solution dropwise. After the coupling, the mixture is stirred for a further 30 minutes at room temperature, heated to 80° C. by passing steam in and, after adding 3 g of 1,2-dichlorobenzene dropwise, is stirred at 80°–85° C. for 30 minutes. It is cooled to about 60° C. and filtered and the residue is washed with water and dried in a vacuum drying cabinet at about 80° C. After grinding, a yellow pigment powder of high tinctorial strength is obtained which has good fastnesses to light and solvents. The pigment mixture consists of two symmetric and one asymmetric disazo pigment; it contains about 25 mole % of pigment A, 25 mole % of pigment B and 50 mole % of pigment C.

A = 1 mole of 1,2-bis-(5-nitro-2-amino-phenoxy)-ethane coupled with 2 moles of acetoacetanilide.
B = 1 mole of 1,2-bis-(3-nitro-4-amino-phenoxy)-ethane coupled with 2 moles of acetoacetanilide.
C = 1 mole of (3',5''-dinitro-4',2''-diamino)-1,2-diphenoxy-ethane coupled with 2 moles of acetoacetanilide.

EXAMPLE 11

262 g of 1,2-bis-(2-acetamino-phenoxy)-ethane and 66 g of 1,2-bis-(3-acetamino-phenoxy)-ethane are dissolved in 900 ml of sulfuric acid (96% strength) at 10°–15° C. and nitrated with a mixture of 195 ml of nitric acid (65% strength) and 200 ml of sulfuric acid (96% strength) at 5°–10° C. The mixture is subsequently stirred for 3 hours at this temperature, and thereafter for 1 hour at room temperature, and then poured on to 9,000 g of ice/water, whilst stirring. The brown precipitate is filtered off on an acid-resistant filter, washed with water until neutral and dried in vacuo at about 80° C. In order to split off the acetyl groups, 100 g of the reaction product are introduced into 2,000 ml of sulfuric acid (60% strength) having a temperature of 120° C., whilst stirring, and the mixture is stirred at 125°–130° C. for 15 minutes. The reaction composition is poured into ten times the volume of water, whilst still hot, and is rendered alkaline with sodium hydroxide solution. The mixture of dinitro-diamines which has separated out is filtered off, washed with water and dried in vacuo at about 80° C.

33.4 g of the resulting mixture of dinitro-diamines are diazotized according to Example 4 and coupled with a fineparticled suspension, prepared analogously to Example 1, of 43.1 g of acetoacetyl-2,4-xylidide. Coupling is effected at 20° C. in the course of 1 hour, the pH value being kept at 5.0–5.5 by adding 5 N sodium hydroxide solution dropwise. After the coupling, the mixture is filtered and the residue is washed with water. A 5% strength aqueous suspension of the press cake is prepared and this is heated to 120°–125° C. in a pressure vessel for 2 hours. The pigment mixture is filtered off, dried in vacuo at about 80° C. and ground. A reddish-tinged yellow pigment powder of high tinctorial strength is obtained which consists of several symmetric disazo compounds.

In the tables which follow, further pigments are described which are obtained by coupling the bis-diazotized diamines in Column I with the ketomethylene compounds in Column II. The color shade which is obtained when a 15% strength letterpress printing ink prepared with the pigment is printed with an ink coating of 1 g/m² on to white glossy paper is indicated in Column III.

Table 1

| Example | I | II | III |
|---|---|---|---|
| 12 | bis-(5-Nitro-2-amino-phenoxy)-methane | Acetoacetyl-4-toluidide | greenish-tinged yellow |
| 13 | bis-(5-Nitro-2-amino-phenoxy)-methane | Acetoacetyl-2-chloro-anilide | greenish-tinged yellow |
| 14 | bis-(5-Nitro-2-amino-phenoxy)-methane | Acetoacetyl-2-anisidide | greenish-tinged yellow |
| 15 | bis-(5-Nitro-2-amino-phenoxy)-methane | Acetoacetyl-3-anisidide | greenish-tinged yellow |
| 16 | bis-(5-Nitro-2-amino-phenoxy)-methane | Acetoacetyl-4-anisidide | reddish-tinged yellow |
| 17 | bis-(5-Nitro-2-amino-phenoxy)-methane | Acetoacetyl-2-phenetidide | greenish-tinged yellow |
| 18 | bis-(5-Nitro-2-amino-phenoxy)-methane | Acetoacetyl-4-phenetidide | reddish-tinged yellow |
| 19 | bis-(5-Nitro-2-amino-phenoxy)-methane | Acetoacetyl-2,4-dimethylanilide | reddish-tinged yellow |
| 20 | bis-(5-Nitro-2-amino-phenoxy)-methane | Acetoacetyl-4-acetylaminoanilide | yellow |
| 21 | bis-(5-Nitro-2-amino-phenoxy)-methane | Acetoacetyl-2-methyl-3-chloroanilide | yellow |
| 22 | bis-(5-Nitro-2-amino-phenoxy)-methane | 3-Acetoacetylamino-benzamide | greenish-tinged yellow |
| 23 | bis-(5-Nitro-2-amino-phenoxy)-methane | 4-Acetoacethylamino-benzamide | greenish-tinged yellow |
| 24 | bis-(4-Chloro-5-nitro-2-amino-phenoxy)-methane | Acetoacetanilide | greenish-tinged yellow |
| 25 | bis-(4-Chloro-5-nitro-2-amino-phenoxy)-methane | Acetoacetyl-2-toluidide | greenish-tinged yellow |

Table 2

| Example | I | II | III |
|---|---|---|---|
| 26 | 1,2-bis-(5-Nitro-2-amino-phenoxy)-ethane | Acetoacetyl-2-toluidide | greenish-tinged yellow |
| 27 | 1,2-bis-(5-Nitro-2-amino-phenoxy)-ethane | Acetoacetyl-4-toluidide | greenish-tinged yellow |

Table 2-continued

| Example | I | II | III |
| --- | --- | --- | --- |
| 28 | 1,2-bis-(5-Nitro-2-amino-phenoxy)-ethane | Acetoacetyl-2-chloro-anilide | greenish-tinged yellow |
| 29 | 1,2-bis-(5-Nitro-2-amino-phenoxy)-ethane | Acetoacetyl-4-chloro-anilide | yellow |
| 30 | 1,2-bis-(5-Nitro-2-amino-phenoxy)-ethane | Acetoacetyl-2-anisidide | greenish-tinged yellow |
| 31 | 1,2-bis-(5-Nitro-2-amino-phenoxy)-ethane | Acetoacetyl-4-anisidide | reddish-tinged yellow |
| 32 | 1,2-bis-(5-Nitro-2-amino-phenoxy)-ethane | Acetoacetyl-2-phenetidide | greenish-tinged yellow |
| 33 | 1,2-bis-(5-Nitro-2-amino-phenoxy)-ethane | Acetoacetyl-2,4-dimethylanilide | reddish-tinged yellow |
| 34 | 1,2-bis-(5-Nitro-2-amino-phenoxy)-ethane | Acetoacetyl-2-methyl-4-chloroanilide | greenish-tinged yellow |
| 35 | 1,2-bis-(5-Nitro-2-amino-phenoxy)-ethane | 3-Acetoacetylamino-benzamide | greenish-tinged yellow |
| 36 | 1,2-bis-(5-Nitro-2-amino-phenoxy)-ethane | 4-Acetoacetylamino-benzamide | greenish-tinged yellow |
| 37 | 1,2-bis-(5-Nitro-2-amino-phenoxy)-ethane | 3-Acetoacetylamino-4-methoxy-benzamide | greenish-tinged yellow |
| 38 | 1,2-bis-(4-Chloro-5-nitro-2-amino-phenoxy)-ethane | Acetoacetanilide | greenish-tinged yellow |
| 39 | 1,2-bis-(4-Chloro-5-nitro-2-amino-phenoxy)-ethane | Acetoacetyl-2-toluidide | greenish-tinged yellow |

Table 3

| Example | I | II | III |
| --- | --- | --- | --- |
| 40 | 1,3-bis-(5-Nitro-2-amino-phenoxy)-propane | Acetoacetanilide | greenish-tinged yellow |
| 41 | 1,3-bis-(5-Nitro-2-amino-phenoxy)-propane | Acetoacetyl-2-toluidide | greenish-tinged yellow |
| 42 | 1,3-bis-(5-Nitro-2-amino-phenoxy)-propane | Acetoacetyl-2-anisidide | greenish-tinged yellow |
| 43 | 1,3-bis-(5-Nitro-2-amino-phenoxy)-propane | Acetoacetyl-2,4-dimethylanilide | reddish-tinged yellow |
| 44 | 1,3-bis-(5-Nitro-2-amino-phenoxy)-propane | 3-Acetoacetylamino-benzamide | greenish-tinged yellow |
| 45 | 1,3-bis-(5-Nitro-2-amino-phenoxy)-propane | 4-Acetoacetylamino-benzamide | greenish-tinged yellow |
| 46 | 1,4-bis-(5-Nitro-2-amino-phenoxy)-butane | Acetoacetanilide | greenish-tinged yellow |
| 47 | 1,4-bis-(5-Nitro-2-amino-phenoxy)-butane | Acetoacetyl-2-toluidide | greenish-tinged yellow |
| 48 | 1,4-bis-(5-Nitro-2-amino-phenoxy)-butane | Acetoacetyl-2,4-dimethylanilide | reddish-tinged yellow |
| 49 | 1,4-bis-(5-Nitro-2-amino-phenoxy)-butane | 3-Acetoacetylamino-benzamide | greenish-tinged yellow |
| 50 | 1,4-bis-(5-Nitro-2-amino-phenoxy)-butane | 4-Acetoacetylamino-benzamide | greenish-tinged yellow |
| 51 | 1,4-bis-(5-Nitro-2-amino-phenoxy)-butane | 4-Acetoacetylamino-benzenesulfonamide | greenish-tinged yellow |
| 52 | 1,4-bis-(4-Chloro-5-nitro-2-amino-phenoxy)-butane | Acetoacetyl-2-anisidide | greenish-tinged yellow |
| 53 | 1,4-bis-(4,6-Dinitro-2-amino-phenoxy)-butane | Acetoacetyl-2,4-dimethylanilide | reddish-tinged yellow |

Table 4

| Example | I | II | III |
| --- | --- | --- | --- |
| 54 | bis-(3-Nitro-4-amino-phenoxy)-methane | Acetoacetanilide | greenish-tinged yellow |
| 55 | bis-(3-Nitro-4-amino-phenoxy)-methane | Acetoacetyl-2-anisidide | greenish-tinged yellow |
| 56 | bis-(3-Nitro-4-amino-phenoxy)-methane | Acetoacetyl-2-toluidide | greenish-tinged yellow |
| 57 | bis-(3-Nitro-4-amino-phenoxy)-methane | Acetoacetyl-4-toluidide | yellow |
| 58 | bis-(3-Nitro-4-amino-phenoxy)-methane | Acetoacetyl-2-chloro-anilide | greenish-tinged yellow |
| 59 | bis-(3-Nitro-4-amino-phenoxy)-methane | Acetoacetyl-4-chloro-anilide | yellow |
| 60 | bis-(3-Nitro-4-amino-phenoxy)-methane | Acetoacetyl-2-methyl-4-chloroanilide | yellow |
| 61 | bis-(3-Nitro-4-amino-phenoxy)-methane | Acetacetyl-2,4-dichloroanilide | yellow |
| 62 | bis-(3-Nitro-4-amino-phenoxy)-methane | Acetoacetyl-2,5-dichloroanilide | greenish-tinged yellow |
| 63 | bis-(3-Nitro-4-amino-phenoxy)-methane | 3-Acetoacetylamino-benzamide | yellow |
| 64 | bis-(3-Nitro-4-amino-phenoxy)-methane | 4-Acetoacetylamino-benzamide | reddish-tinged yellow |

Table 4-continued

| Example | I | II | III |
|---|---|---|---|
| 65 | bis-(3-Nitro-4-amino-phenoxy)-methane | 3-Acetoacetylamino-4-methoxy-benzamide | reddish-tinged yellow |
| 66 | 1,2-bis-(4-Nitro-6-methyl-2-amino-phenoxy)-ethane | Acetoacetyl-2,5-xylidide | reddish-tinged yellow |
| 67 | 1,2-bis-(6-Chloro-4-nitro-2-amino-phenoxy)-ethane | Acetoacetyl-2-anisidide | greenish-tinged yellow |

Table 5

| Example | I | II | III |
|---|---|---|---|
| 68 | bis-(3-Nitro-4-amino-phenoxy)-methane | 1-Phenyl-3-methyl-pyrazol-5-one | orange |
| 69 | bis-(3-Nitro-4-amino-phenoxy)-methane | 1-(4'-Tolyl)-3-methyl-pyrazol-5-one | orange |
| 70 | 1,2-bis-(3-Nitro-4-amino-phenoxy)-ethane | 1-Phenyl-3-methyl-pyrazol-5-one | orange |
| 71 | 1,2-bis-(3-Nitro-4-amino-phenoxy)-ethane | 1-(4'-Tolyl)-3-methyl-pyrazol-5-one | orange |
| 72 | 1,3-bis-(3-Nitro-4-amino-phenoxy)-propane | 1-(2'-Chlorophenyl)-3-methyl-pyrazol-5-one | orange |
| 73 | 1,4-bis-(3-Nitro-4-amino-phenoxy)-butane | 1-(4'-Tolyl)-3-methyl-pyrazol-5-one | orange |
| 74 | bis-(5-Nitro-2-amino-phenoxy)-methane | 1-Phenyl-3-methyl-pyrazol-5-one | orange |
| 75 | bis-(5-Nitro-2-amino-phenoxy)-methane | 1-(4'-Tolyl)-3-methyl-pyrazol-5-one | orange |
| 76 | 1,2-bis-(5-Nitro-2-amino-phenoxy)-ethane | 1-Phenyl-3-methyl-pyrazol-5-one | orange |
| 77 | 1,2-bis-(5-Nitro-2-amino-phenoxy)-ethane | 1-(4'-Tolyl)-3-methyl-pyrazol-5-one | orange |
| 78 | 1,3-bis-(5-Nitro-2-amino-phenoxy)-propane | 1-(4'-Chlorophenyl)-3-methyl-pyrazol-5-one | orange |
| 79 | 1,4-bis-(5-Nitro-2-amino-phenoxy)-butane | 1-(4'-Tolyl)-3-methyl-pyrazol-5-one | orange |
| 80 | 1,4-bis-(4-Chloro-5-nitro-2-amino-phenoxy)-butane | 1-Phenyl-3-methyl-pyrazol-5-one | orange |
| 81 | 1,4-bis-(4,6-Dinitro-2-amino-phenoxy)-butane | 1-Phenyl-3-methyl-pyrazol-5-one | orange |

Table 6

| Example | I | II | III |
|---|---|---|---|
| 82 | 1,5-bis-(3-Nitro-4-amino-phenoxy)-pentane | Acetoacetyl-2,4-dimethylanilide | reddish-tinged yellow |
| 83 | 1,6-bis-(3-Nitro-4-amino-phenoxy)-hexane | Acetoacetyl-2,4-dimethylanilide | reddish-tinged yellow |
| 84 | 1,10-bis-(3-Nitro-4-amino-phenoxy)-decane | Acetoacetyl-2,4-dimethylanilide | reddish-tinged yellow |
| 85 | 1,2-bis-(2-Nitro-4-amino-phenoxy)-ethane | Acetoacetyl-2,4-dimethoxyanilide | yellow |
| 86 | 1,2-bis-(2-Nitro-4-amino-phenoxy)-ethane | Acetoacetyl-2,5-dimethoxy-4-chloro-anilide | yellow |
| 87 | 1,2-bis-(2-Nitro-4-amino-phenoxy)-ethane | 5-Acetoacetylamino-7-chlorobenzimidazolone | yellow |
| 88 | 1,2-bis-(4-Nitro-2-amino-phenoxy)-ethane | Acetoacetyl-2,4-dimethoxyanilide | yellow |
| 89 | 1,2-bis-(4-Nitro-2-amino-phenoxy)-ethane | Acetoacetyl-2,5-dimethoxyanilide | yellow |
| 90 | 1,4-bis-(4-Nitro-2-amino-phenoxy)-butane | Acetoacetyl-2,5-dimethoxy-4-chloro-anilide | yellow |
| 91 | 1,4-bis-(4-Nitro-2-amino-phenoxy)-butane | 5-Acetoacetylamino-benzimidazolone | yellow |
| 92 | 1,2-bis-(2-Nitro-4-amino-phenoxy)-ethane | 1-Phenyl-3-methyl-pyrazol-5-one | orange |
| 93 | 1,2-bis-(4-Nitro-2-amino-phenoxy)-ethane | 1-Phenyl-3-methyl-pyrazol-5-one | orange |
| 94 | 1,2-bis-(4-Chloro-6-nitro-2-amino-phenoxy)-ethane | Acetoacetyl-2-toluidide | greenish-tinged yellow |
| 95 | 1,2-bis-(6-Chloro-4-nitro-2-amino-phenoxy)-ethane | Acetoacetyl-2-phenetidide | greenish-tinged yellow |

Table 7

| Example | I | II | III |
|---|---|---|---|
| 96 | (4',5''-Dinitro-2',2''-diamino)-1,2-diphenoxy-ethane | Acetoacetanilide | greenish-tinged yellow |
| 97 | (4',5''-Dinitro-2',2''-diamino)-1,2-diphenoxy-ethane | Acetoacetyl-2-toluidide | greenish-tinged yellow |
| 98 | (4',5''-Dinitro-2',2''-diamino)-1,2-diphenoxy-ethane | Acetoacetyl-2-anisidide | greenish-tinged yellow |
| 99 | (4',5''-Dinitro-2',2''-diamino)-1,2-diphenoxy-ethane | 1-(4'-Tolyl)-3-methyl-pyrazol-5-one | orange |
| 100 | (4',5''-Dinitro-2',2''-diamino)-1,3-diphenoxy-propane | 4-Acetoacetylamino-benzamide | greenish-tinged yellow |
| 101 | (4',5''-Dinitro-2',2''-diamino)-1,4-diphenoxy-butane | 3-Acetoacetylamino-benzamide | greenish-tinged yellow |
| 102 | (3',5''-Dinitro-4',2''-diamino)-1,2-diphenoxy-ethane | Acetoacetyl-2-chloro-anilide | yellow |
| 103 | (3',5''-Dinitro-4',2''-diamino)-1,2-diphenoxy-ethane | Acetoacetyl-2,4-dimethoxyanilide | reddish-tinged yellow |
| 104 | (3',5''-Dinitro-4',2''-diamino)-1,2-diphenoxy-ethane | 1-(4'-Chlorophenyl)-3-methyl-pyrazol-5-one | orange |
| 105 | (2',3''-Dinitro-4',4''-diamino)-1,2-diphenoxy-ethane | Acetoacetyl-4-toluidide | yellow |
| 106 | (2',3''-Dinitro-4',4''-diamino)-1,2-diphenoxy-ethane | Acetoacetyl-4-chloro-anilide | yellow |
| 107 | (2',3''-Dinitro-4',4''-diamino)-1,2-diphenoxy-ethane | 1-Phenyl-3-methyl-pyrazol-5-one | orange |
| 108 | (4'-Chloro-5',5''-dinitro-2',2''-diamino)-1,2-diphenoxy-ethane | Acetoacetyl-2-toluidide | greenish-tinged yellow |
| 109 | (4'-Chloro-5',3''-dinitro-2',4''-diamino)-1,2-diphenoxy-ethane | Acetoacetyl-2,5-dimethylanilide | reddish-tinged yellow |

EXAMPLE 110

32 g of bis-(3-nitro-4-amino-phenoxy)-methane are bis-diazotized as described in Example 1 and coupled with a fine-particled suspension prepared from 18.6 g of acetoacetanilide and 20.1 g of acetoacetyl-o-toluidide according to Example 1. After the coupling, the mixture is subsequently stirred at room temperature for 2 hours and filtered and the residue is washed with water and dried in vacuo at about 70° C. After grinding, a yellow pigment is obtained which, after incorporation into a letterpress printing varnish, leads to a letterpress printing ink which gives deep prints of a neutral yellow color shade on white art paper.

The pigment consists of two symmetric disazo compounds and one asymmetric disazo compound.

EXAMPLE 111

The procedure is as described in Example 110, but with the alteration that 32 g of bis-(5-nitro-2-amino-phenoxy)-methane are used as the diazo component. Coupling, after-treatment and working up are carried out as described in Example 1. After grinding, a greenish-tinged yellow pigment is obtained which, when incorporated into a gravure printing ink and printed on to white paper, leads to deep greenish-tinged yellow prints.

The pigment consists of two symmetric disazo compounds and one asymmetric disazo compound.

EXAMPLE 112

The procedure is as described in Example 110, but with the alteration that 18.6 g of acetoacetanilide and 21.6 g of acetoacetyl-2,4-xylidide are used as the coupling component mixture. After the coupling, the mixture is subsequently stirred at room temperature for 30 minutes, heated to 80° C. by passing steam in and stirred at 80°–85° C. for 30 minutes. It is filtered at 60° C. and the residue is washed with water and dried in vacuo at about 70° C. After grinding, a reddish-tinged yellow pigment is obtained which, when incorporated into a letterpress printing ink and printed on to white glossy paper, leads to very deep reddish-tinged yellow prints.

The pigment consists of two symmetric disazo compounds and one asymmetric disazo compound.

We claim:

1. A disazo compound of the formula

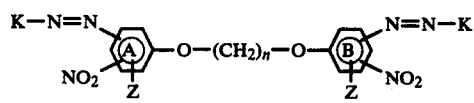

or a mixture thereof, in which n is a number from 1 to 10; Z is hydrogen or halogen, alkyl or alkoxy of up to 4 carbon atoms, or nitro; and K represents identical or different radicals of the formula

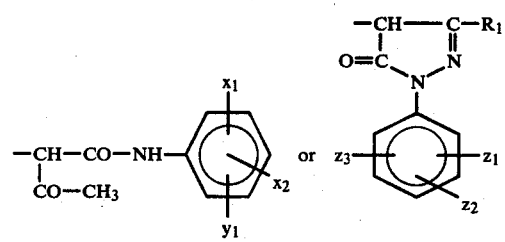

in which $x_1$ and $x_2$ are hydrogen, fluorine, chlorine or bromine, or alkyl or alkoxy of 1 to 6 carbon atoms, or $x_1$ and $x_2$, together with the phenyl moiety to which they are attached, form a naphthalene, benzimidazolone or benzoxazolone ring; $y_1$ is hydrogen, fluorine, chlorine, bromine, or alkyl, alkoxy or carbalkoxy of 1 to 6 carbon atoms in the alkyl moiety, cyano, trifluoromethyl, alkanoylamino with up to 5 carbon atoms, benzoylamino, benzoylamino substituted by chlorine or alkyl or alkoxy of up to 4 carbon atoms, or a group of the formula —X—NR'—R'', in which X is CO or SO$_2$, R' is hydrogen or alkyl of 1 to 4 carbon atoms and R'' is hydrogen, alkyl of 1 to 4 carbon atoms or phenyl; R$_1$ is alkyl of 1 to 6 carbon atoms, carboxyl or carbalkoxy with 1 to 6 carbon atoms in the alkyl moiety; $z_1$ and $z_2$ are hydrogen, fluorine, chlorine or bromine or alkyl or alkoxy of 1 to 6 carbon atoms, or $z_1$ and $z_2$ together with the phenyl moiety to which they are attached from a naphthyl moiety; and $z_3$ is hydrogen, fluorine, chlorine or bromine, alkyl or alkoxy of 1 to 6 carbon atoms or a group of the formula —N—NR'—R", in which X, R' and R" are as defined above.

2. A symmetric disazo compound as defined in claim 1.

3. An asymmetric disazo compound as defined in claim 1.

4. A mixture of compounds as defined in claim 1.

5. A mixture of symmetric and asymmetric disazo compounds as defined in claim 1.

6. Disazo compound according to claim 1, wherein K represents identical or different radicals of the formula

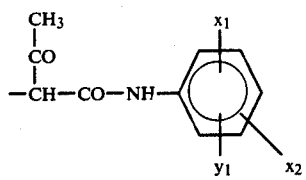

where $x_1$ and $x_2$ denote hydrogen, fluorine, chlorine or bromine, or alkyl or alkoxy with 1 to 6 carbon atoms in each case and $y_1$ denotes hydrogen, fluorine, chlorine or bromine, alkyl, alkoxy or carbalkoxy with 1 to 6 carbon atoms in the alkyl radical in each case, cyano, trifluoromethyl, alkanoylamino with up to 5 C atoms, benzoylamino which is optionally substituted by chlorine or alkyl or alkoxy with up to 4 C atoms in each case, or a group of the formula —X—NR'—R", in which X denotes CO or $SO_2$, R' denotes hydrogen or alkyl with 1 to 4 C atoms and R" denotes hydrogen, alkyl with 1 to 4 C atoms or phenyl or $x_1$ and $x_2$ together form a fused benzene, imidazolone or oxazolone ring.

7. Disazo compound according to claim 1, wherein K represents identical or different radicals of the formula

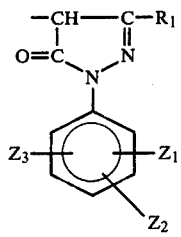

where $R_1$ is alkyl with 1 to 6 carbon atoms, carboxyl or carbalkoxy with 1 to 6 carbon atoms in the alkyl radical, $z_1$ and $z_2$ denote hydrogen, fluorine, chlorine or bromine, or alkyl or alkoxy with 1 to 6 carbon atoms in each case and $z_3$ denotes hydrogen, fluorine, chlorine or bromine, alkyl or alkoxy with 1 to 6 carbon atoms in each case or a group of the formula —N—NR'—R", in which X denotes CO or $SO_2$, R' denotes hydrogen or alkyl with 1 to 4 C atoms and R" denotes hydrogen or alkyl with 1 to 4 C atoms or phenyl or $z_1$ and $z_2$ together form a fused benzene ring.

8. A symmetric disazo compound according to claim 3, wherein n is 1 or 2, Z is hydrogen, $x_1$ is hydrogen, methyl or carbamoyl, $x_2$ is hydrogen or methyl and $y_1$ is hydrogen, the azo groups being in 2- or 4-position and the nitro groups being in 3-, 5- or 6-position, the position of the ether oxygen defining the 1-position.

9. The compound as claimed in claim 8, wherein n is 1, $x_1$ and $x_2$ are hydrogen, the azo groups being in 2-position and the nitro groups being in 5-position.

10. The compound as claimed in claim 8, wherein n is 1, $x_1$ is o-methyl, $x_2$ is hydrogen, the azo groups being in 2-position and the nitro groups in 5-position.

11. The compound as claimed in claim 8, wherein n is 1, $x_1$ is o-methyl, $x_2$ is p-methyl, the azo groups being in 4-position and the nitro groups in 3-position.

12. The compound as claimed in claim 8, wherein n is 1, $x_1$ is p-carbamoyl, $x_2$ is hydrogen, the azo groups being in 2-position and the nitro groups in 5-position.

13. The compound as claimed in claim 8, wherein n is 2, $x_1$ is o-methyl, $x_2$ is hydrogen, the azo groups being in 2-position and the nitro groups in 5-position.

* * * * *